W. O. PLATT.
BEARING FOR OIL WELL JACKS AND SWING LEVERS.
APPLICATION FILED JAN. 23, 1912.
1,129,229.
Patented Feb. 23, 1915.
2 SHEETS—SHEET 1.
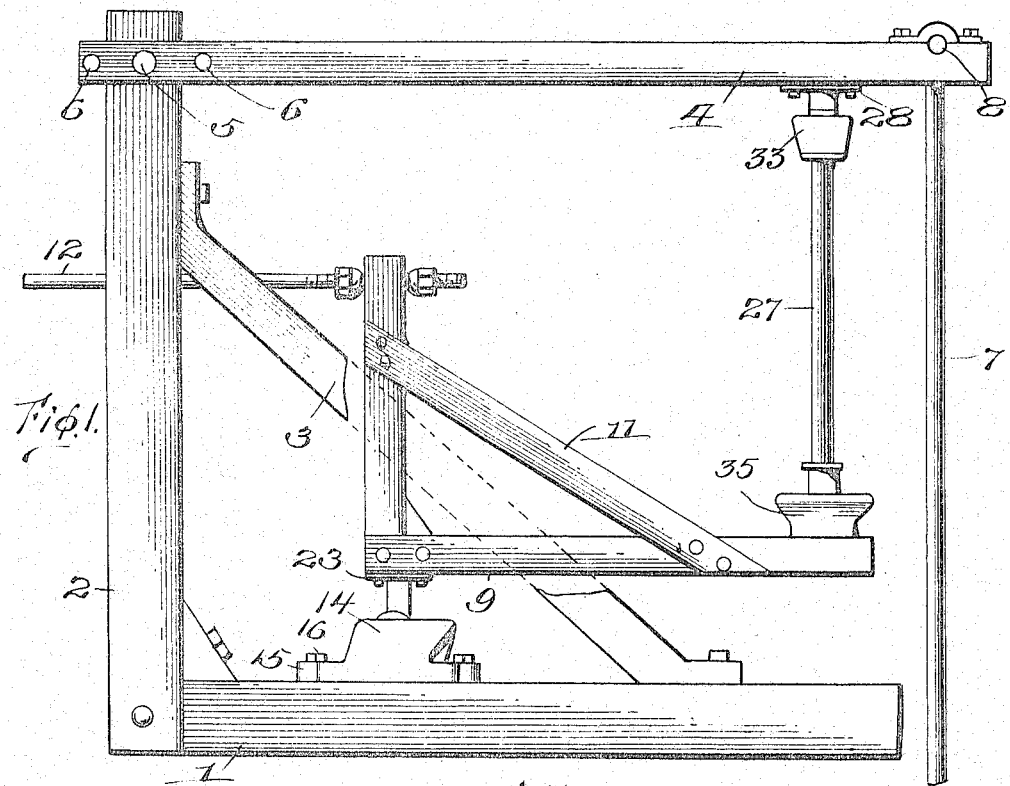
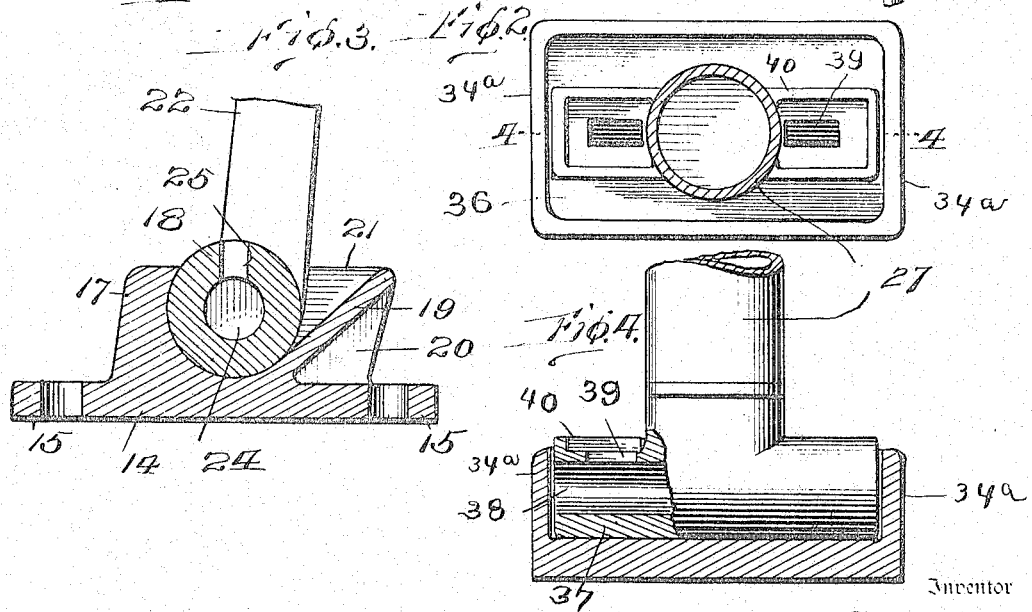

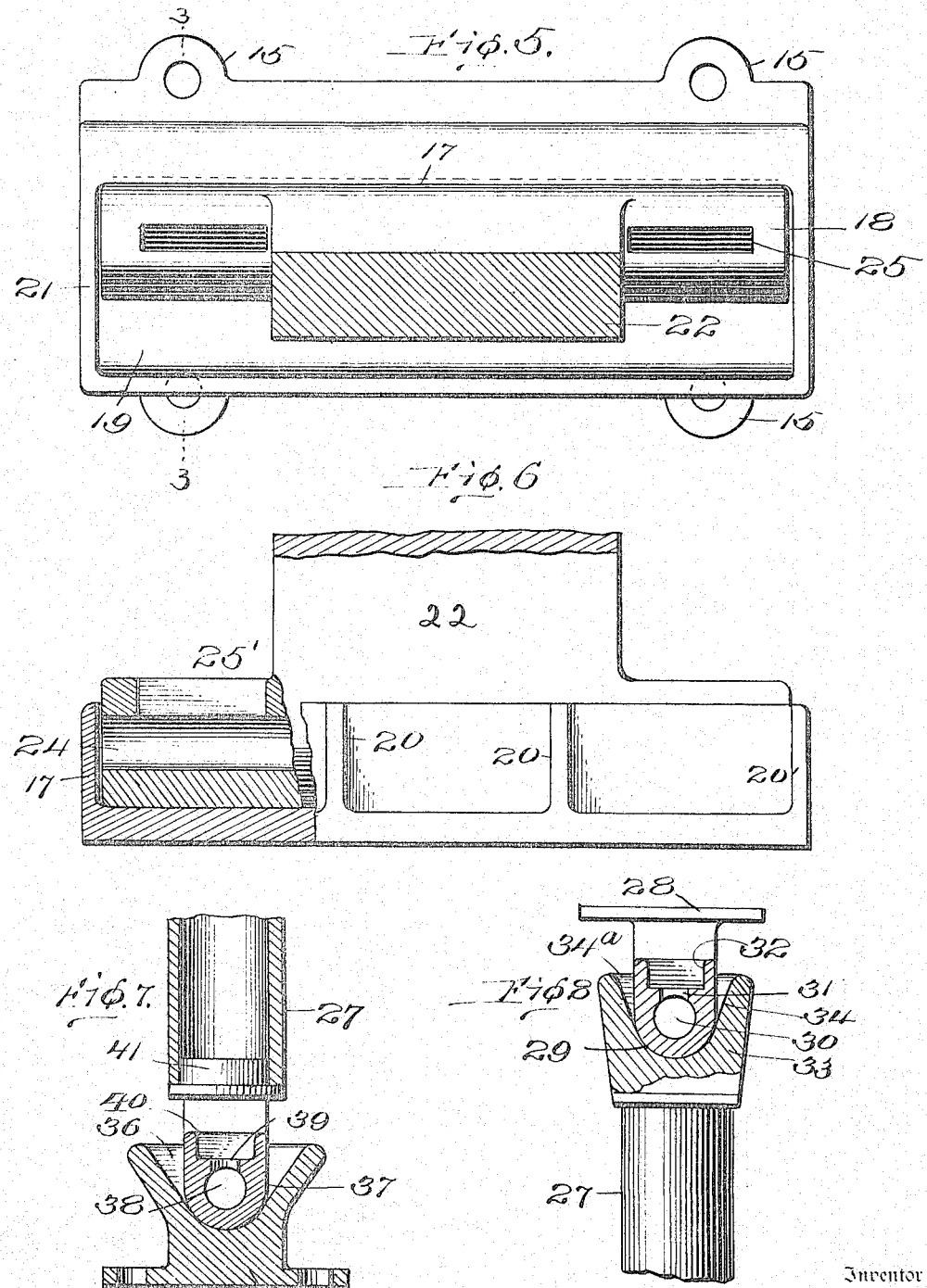

UNITED STATES PATENT OFFICE.

WILBER O. PLATT, OF OIL CITY, PENNSYLVANIA, ASSIGNOR TO JOSEPH REID GAS ENGINE COMPANY, OF OIL CITY, PENNSYLVANIA, A CORPORATION OF PENNSYLVANIA.

BEARING FOR OIL-WELL JACKS AND SWING-LEVERS.

1,129,229.  Specification of Letters Patent.  Patented Feb. 23, 1915.

Application filed January 23, 1912. Serial No. 672,873.

*To all whom it may concern:*

Be it known that I, WILBER O. PLATT, a citizen of the United States, residing at Oil City, in the county of Venango and State of Pennsylvania, have invented certain new and useful Improvements in Bearings for Oil-Well Jacks and Swing-Levers, of which the following is a specification.

In the operation of oil wells there are numerous bearings where the moving members do not revolve, but have a backward and forward motion. This motion of the moving members is relatively slow and they are under conditions where they receive very little attention. To meet such conditions and to provide for easy assembling and disassembling, the bearings shown have been devised.

In Figures 1, 3, 5 and 6 of the drawing forming part of this application, is illustrated a bearing in which the resultant forces act, not in a vertical or a horizontal direction, but at an angle between them. One side of the bottom plate extends up around the side of the shaft, while the other side of the plate runs out at an angle, as shown. The shaft, in assembling, slides down this incline into its bearing. Through the center of the shaft is a hole with openings on the top; said hole providing a reservoir for oil or grease for lubricating purposes. By filling this hole or bore with a suitable grease, the bearing will be self-oiling for a considerable length of time without further attention. Should it be desirable, the sides of the bearing plate will act as stops to limit backward and forward motion of the shaft. By varying the dimensions of the part that extends upward from the shaft, varying amounts of motion are provided for. This part can be attached to whatever the bearing is intended for. The remaining four figures of the drawing show a bearing in which the backward and forward movement of the shaft is very little and where the pressure is downward, so that the sides of the bearing plate are not set at as great an angle. In using such bearings, the shaft may be the moving part, or the bearing plate may be the moving part, or both of them may have motion. The principal use of such bearings is in oil well jacks, swing posts, and swing levers as used in the oil country in pumping oil and water wells.

In the drawing, Fig. 1 is a side elevation of a pump jack embodying my invention; Fig. 2 is a top plan view of the bearing plate shown in Figs. 7 and 8; Fig. 3 is a vertical central section on the line 3—3, Fig. 5; Fig. 4 is a vertical central section on the line 4—4, Fig. 2, parts being in elevation; Fig. 5 is a top plan view of the bearing plate; Fig. 6 is a front elevation of the plate shown in Figs. 3 and 5, parts being in section, and Figs. 7 and 8 are vertical central sections of another bearing with associated parts.

1 represents a sill of suitable construction, of a pump jack; 2 is the post thereof, which sill and post are braced by means of the brace 3.

4 is the walking beam of the jack pivoted at 5 to the post 2. At the outer end of the walking beam, the pump rod 7 is suitably mounted in the bearing 8.

9 is a jack which may be of any preferred construction. 12 is the power rod secured to the jack.

14 is the bearing plate for the jack having flanges 15, through which the bolts 16 pass to firmly secure it to the sill 1. The side 17 of the bearing plate extends upward from a bearing groove on the plate to a point beyond the center of the journal 18, and has its inner face concaved to form a bearing for the journal, the concave conforming to the arc of the groove. The other side wall 19 of the bearing extends upward and outward at an angle to the groove, as shown in Fig. 3, and for its major portion is spaced from the journal 18.

20 are ribs formed integral with the base plate of the bearing 14 and the upwardly extending side 19.

21 are the end walls of the bearing extending upward at right angles to the groove and constitute stops for the journal.

22 is an arm extending upward from and integral with the journal 18 carrying a plate 23, which is secured to the jack thereby mounting the jack on the journal 18. This arm, it is to be understood, may be of any desired construction. The journal 18 is hollow to provide a grease receptacle 24, into which ports 25 lead.

In Figs. 7 and 8, I have shown bearings for the pitman 27. The bearing for the upper end of the pitman, in the embodiment shown, comprises the plate 28, adapted to be secured to the walking beam, provided with a depending portion comprising the journal 29, having a grease receptacle 30 formed throughout its length by making said journal hollow, there being a port 31 leading into said receptacle. The port 31 is surrounded by walls 32 to prevent splashing. Secured to the upper end of pitman 27 is a journal bearing 33, the walls of which flare outwardly and upwardly as at 34, the flare being gradual from top to bottom. The end walls 34ª extend upward at right angles and constitute stops for the journal 29.

The lower bearing plate 35 for the pitman is suitably secured to the jack and is provided with a flaring journal bearing 36 similar to the journal bearing on the upper end of the pitman. 37 is a journal having the grease receptacle 38, port 39 and walls 40 surrounding said port, similar to the parts described in connection with Fig. 8. Secured to this journal 37 is a plug 41 adapted to be firmly secured to the lower end of the pitman 27.

After the device is set up, the grease or oil receptacles are filled with a suitable lubricant, so that no further attention need be given them for quite a long period.

In stepping the journal 18 in its bearing plate, the journal is slid down on the incline 19 until it is seated in the bearing and when in this position, the bearing 17, as will be seen in Fig. 3, extends above the axis of the journal, whereby the journal is prevented from being lifted vertically out of its bearing. The thrust on the bearings 17 and journal 18, as will be seen from the drawings (Figs. 1, 3, 5 and 6), is not in a vertical nor a horizontal direction, but at an angle between them, while the thrust on the bearings for pitman 27 is vertical.

I claim:—

A journal bearing comprising a base plate having a groove in its upper face, a side wall extending from one side of said groove and having a concaved inner face formed on the arc of the groove which overhangs a journal placed in the bearing, a second side wall extending upwardly from the other side of said groove at an angle thereto less than a right angle and having a straight inner face inclined toward the bottom of the groove, and end walls connecting the ends of the side walls and closing the ends of the groove, in combination with a journal having a central axial bore to serve as a reservoir for lubricant, and a port leading from the top of the journal to said bore.

The foregoing specification signed at Oil City, Pa., this second day of January, 1912.

WILBER O. PLATT.

In presence of—
J. D. TRAX,
WM. M. PARKER.